US012729255B2

(12) United States Patent
Kang et al.

(10) Patent No.: US 12,729,255 B2
(45) Date of Patent: Sep. 8, 2026

(54) PROCESS FOR POLYMERIZING MOLECULAR-WEIGHT CONTROLLED POLYMER

(71) Applicant: KOREA RESEARCH INSTITUTE OF CHEMICAL TECHNOLOGY, Daejeon (KR)

(72) Inventors: Hong Suk Kang, Daejeon (KR); In Joon Park, Daejeon (KR); Shin Hong Yook, Daejeon (KR); Eun-Ho Sohn, Daejeon (KR); Sang Goo Lee, Daejeon (KR); Soo Bok Lee, Daejeon (KR); Won Wook So, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 979 days.

(21) Appl. No.: 17/907,844

(22) PCT Filed: Feb. 22, 2021

(86) PCT No.: PCT/KR2021/002198
§ 371 (c)(1),
(2) Date: Aug. 29, 2022

(87) PCT Pub. No.: WO2021/172831
PCT Pub. Date: Sep. 2, 2021

(65) Prior Publication Data

US 2023/0100403 A1 Mar. 30, 2023

(30) Foreign Application Priority Data

Feb. 28, 2020 (KR) ........................ 10-2020-0025544
Feb. 28, 2020 (KR) ........................ 10-2020-0025545
Mar. 19, 2020 (KR) ........................ 10-2020-0034090

(51) Int. Cl.

| | |
|---|---|
| ***C08F 14/22*** | (2006.01) |
| ***B01J 10/00*** | (2006.01) |
| ***B01J 19/00*** | (2006.01) |
| ***B01J 19/06*** | (2006.01) |
| ***B01J 19/10*** | (2006.01) |
| ***B01J 19/18*** | (2006.01) |
| ***C08F 2/24*** | (2006.01) |
| ***C08F 6/00*** | (2006.01) |
| ***C08F 114/22*** | (2006.01) |
| *C08F 6/12* | (2006.01) |

(52) U.S. Cl.
CPC ........... *C08F 114/22* (2013.01); *B01J 10/002* (2013.01); *B01J 19/0066* (2013.01); *B01J 19/06* (2013.01); *B01J 19/10* (2013.01); *B01J 19/1881* (2013.01); *C08F 14/22* (2013.01); *B01J 2219/00033* (2013.01); *B01J 2219/0869* (2013.01); *B01J 2219/0884* (2013.01); *C08F 2/24* (2013.01); *C08F 6/12* (2013.01); *C08F 2400/02* (2013.01)

(58) Field of Classification Search
CPC ......... C08F 14/22; C08F 114/22; C08F 2/01; C08F 2/24; C08F 6/12
See application file for complete search history.

(56) References Cited

U.S. PATENT DOCUMENTS

| | | | | |
|---|---|---|---|---|
| 6,512,063 B2 * | 1/2003 | Tang | ..................... | C08F 214/26 526/225 |
| 6,723,812 B2 * | 4/2004 | Senninger | ............... | C08F 14/22 526/253 |

FOREIGN PATENT DOCUMENTS

| | | | | | |
|---|---|---|---|---|---|
| CN | 102321272 | A | * | 1/2012 | ...... C08F 214/22102 |
| CN | 102504063 | A | * | 6/2012 | ............ C08F 114/22 |
| CN | 104530276 | B | * | 9/2017 | ............ C08F 114/22 |
| JP | S61-076507 | A | | 4/1986 | |
| JP | H0625321 | A | | 2/1994 | |
| JP | H10-512303 | A | | 11/1998 | |
| JP | H11100404 | A | | 4/1999 | |
| JP | 2001151894 | A | | 6/2001 | |
| KR | 10-1986-0001059 | B1 | | 8/1986 | |
| KR | 10-1989-0004327 | B1 | | 10/1989 | |
| KR | 100714352 | B1 | | 5/2007 | |
| KR | 10-2012-0060444 | A | | 6/2012 | |
| KR | 10-2015-0086600 | A | | 7/2015 | |
| WO | WO-9838242 | A1 | * | 9/1998 | ............. C08J 51/00 |
| WO | WO-00-22002 | A1 | | 4/2000 | |
| WO | WO-0134667 | A1 | * | 5/2001 | ................ C08F 2/04 |

OTHER PUBLICATIONS

International Search Report for International Application No. PCT/KR2021/002198 dated May 27, 2021.

* cited by examiner

*Primary Examiner* — Rip A Lee

(74) *Attorney, Agent, or Firm* — Harness, Dickey & Pierce, P.L.C.

(57) ABSTRACT

According to an embodiment of the present invention, provided is a process for polymerizing molecular weight-adjustable polymer, comprising: a reactant supply step of supplying a gaseous monomer, a surfactant, and an initiator; a polymerization reaction step of performing a polymerization reaction in which the monomer, the surfactant, and the initiator participate; and a product discharging step of discharging the polymer compound produced by the polymerization reaction, wherein the flow rate of the supplied initiator is inversely proportional to the molecular weight of the polymer compound, and the molecular weight of the polymer compound produced by the polymerization reaction is adjusted by controlling the flow rate of the initiator.

5 Claims, 12 Drawing Sheets

[FIG. 2]
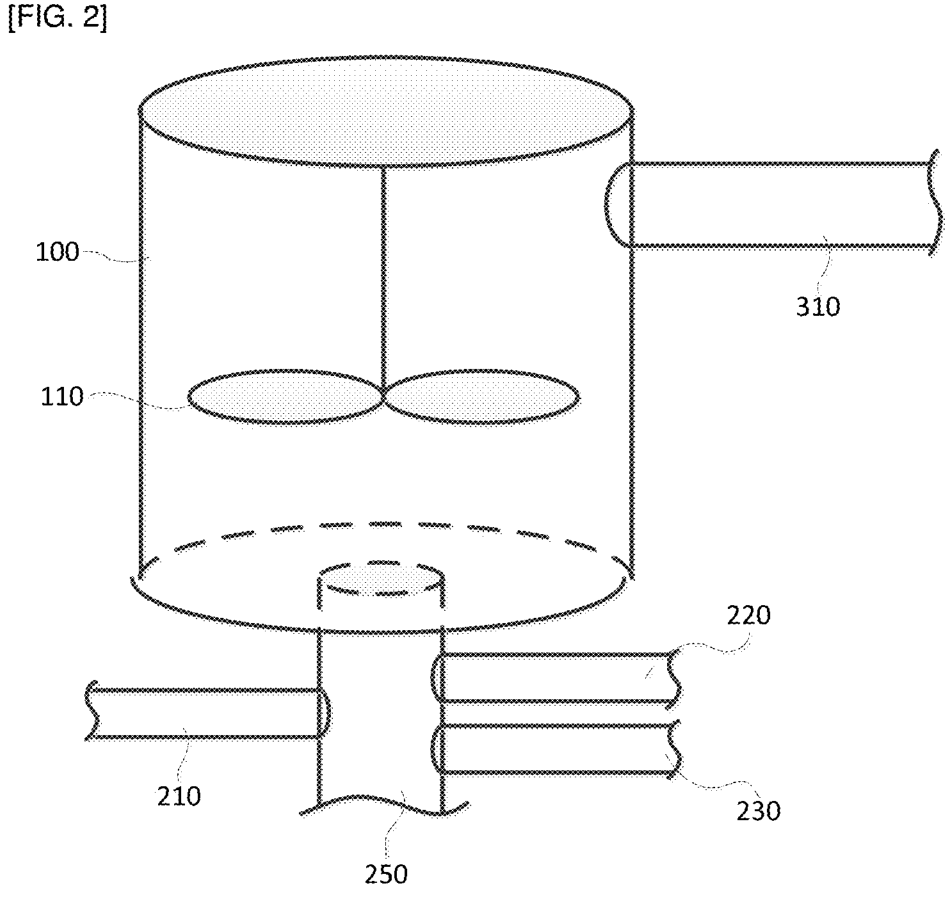

[FIG. 3]

[FIG. 4]
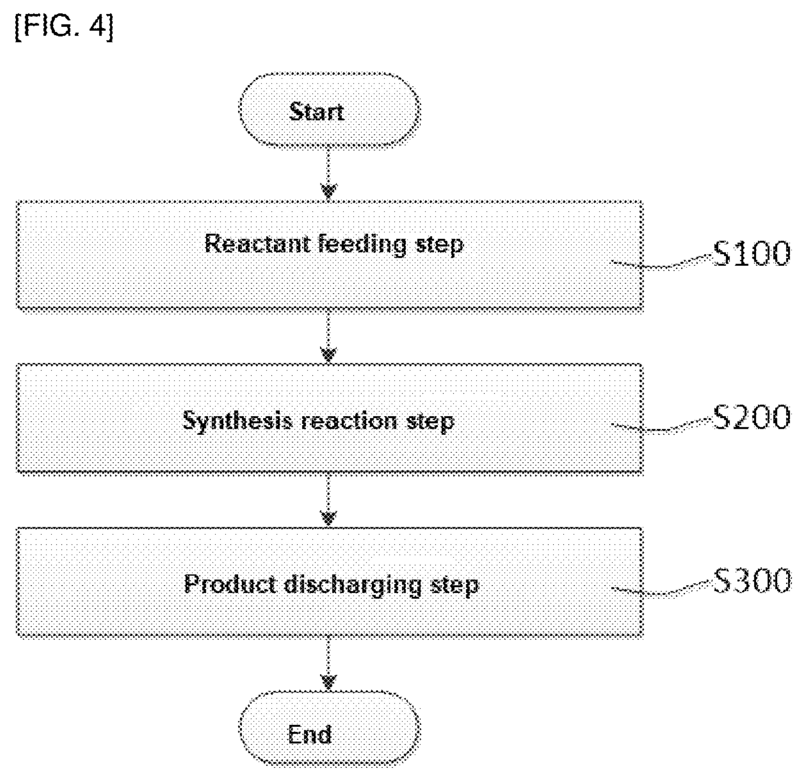

[FIG. 5]
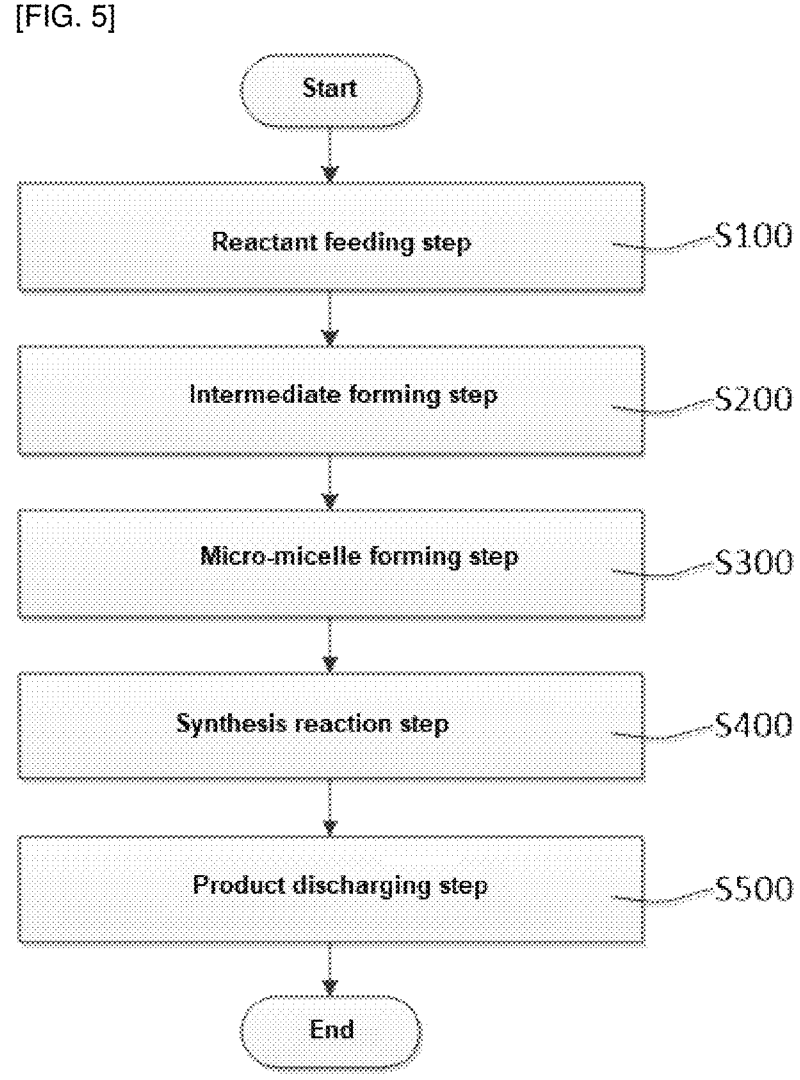

[FIG. 6]
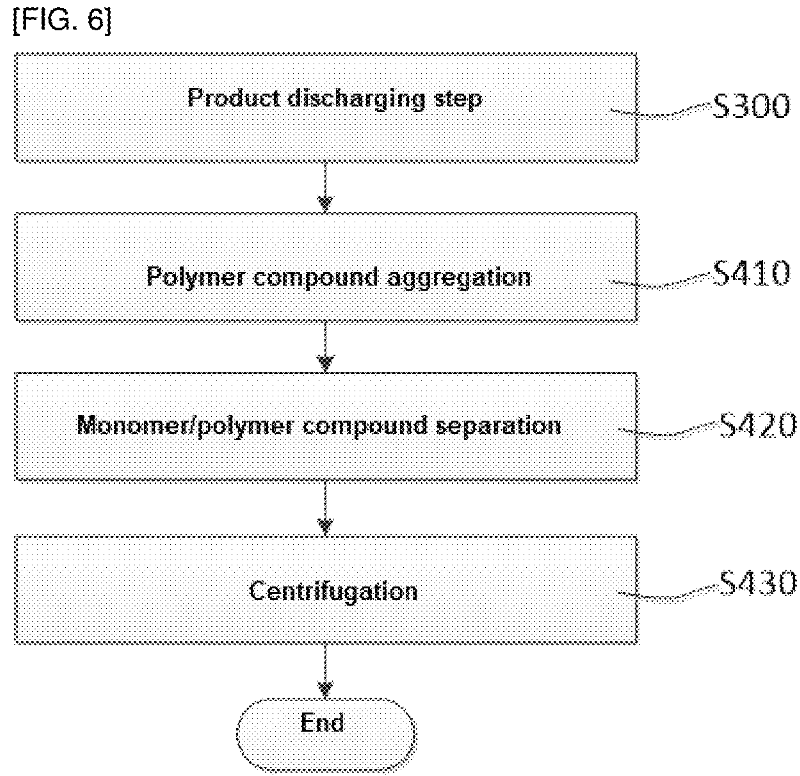

[FIG. 7A]
[FIG. 7B]
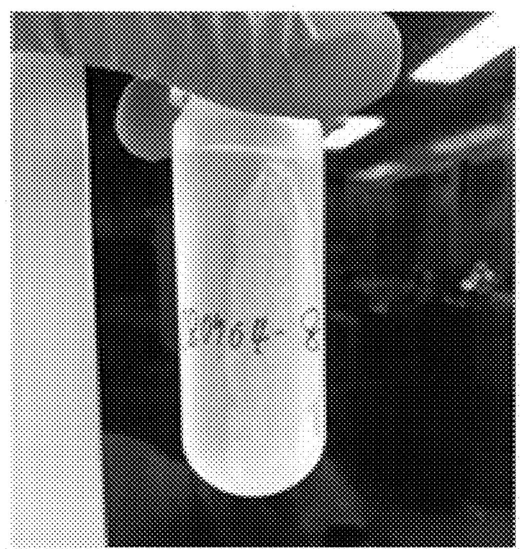

[FIG. 7C]
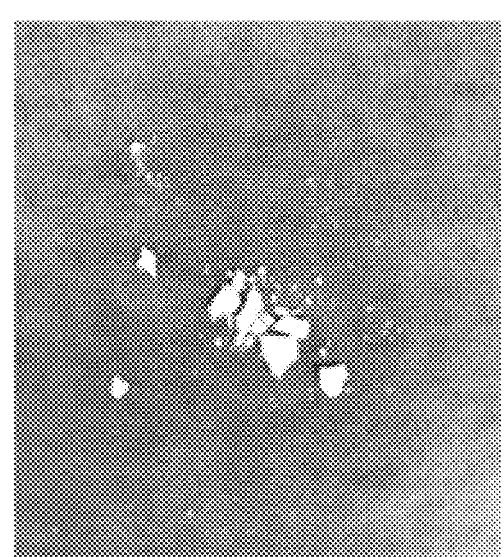

[FIG. 8A]
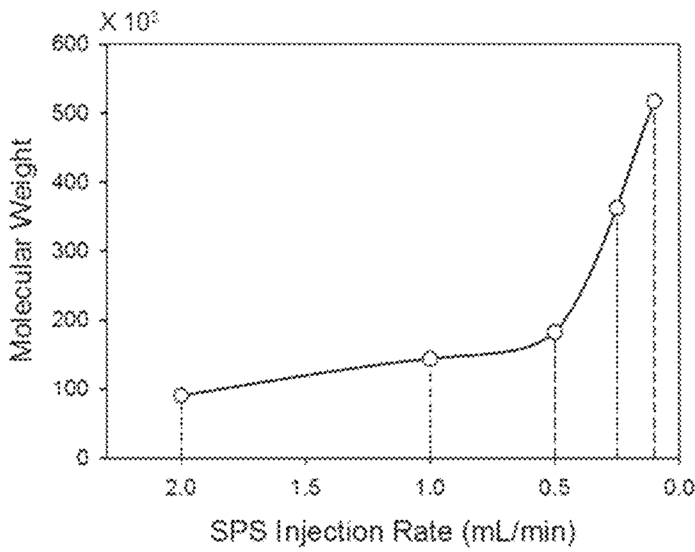

[FIG. 8B]
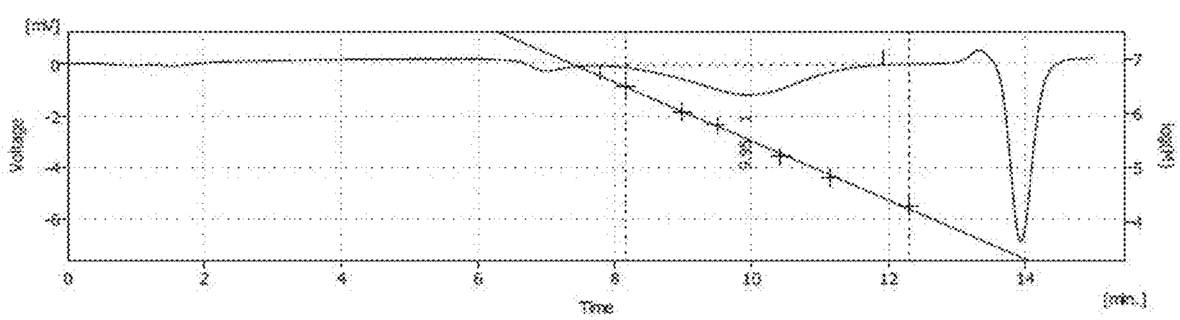
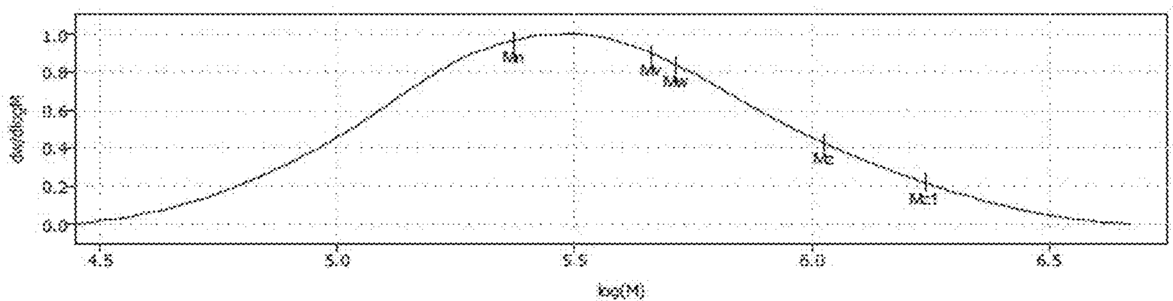
| | Max. RT | Start RT | End RT | Flow Rate Correction | Mp | Mn | Mw |
|---|---|---|---|---|---|---|---|
| 1 | 8.95 | 7.78 | 11.02 | 1.0000 | 321858 | 235798 | 517184 |
| | | | | | | | |

[FIG. 9]
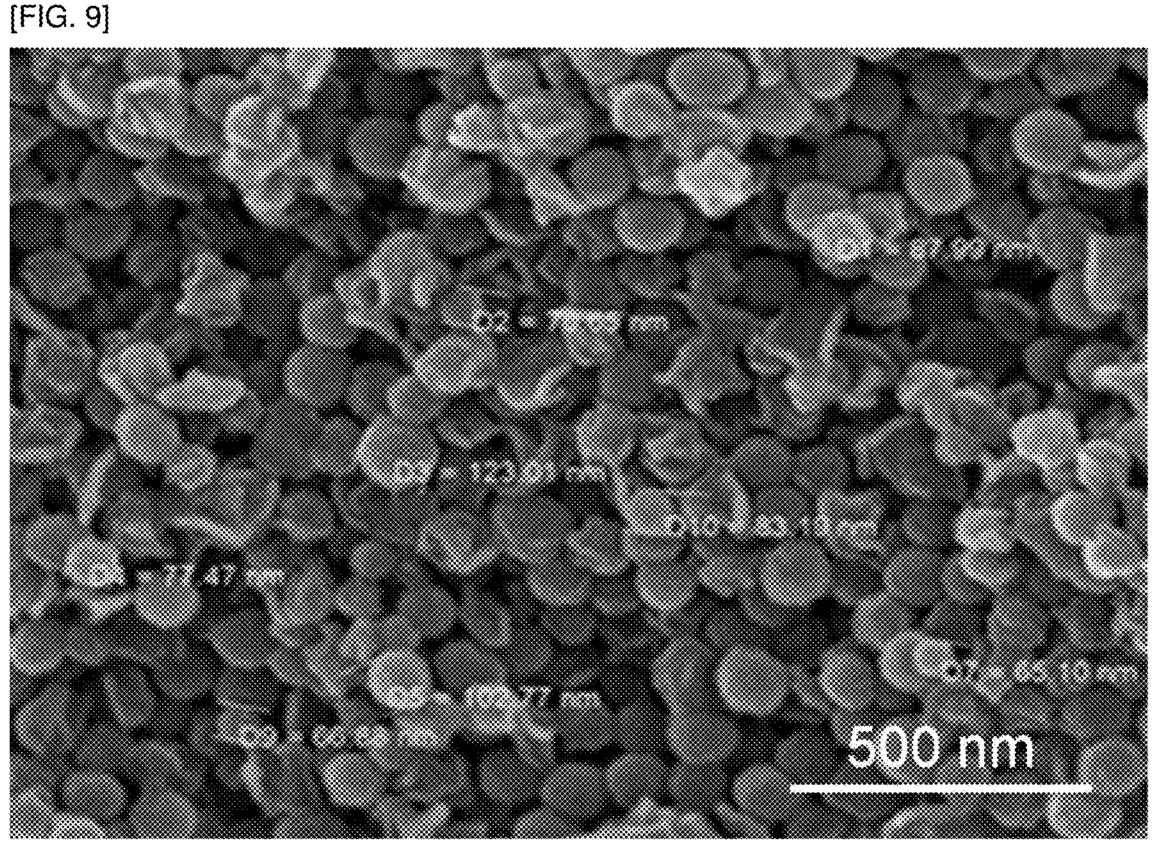

[FIG. 10]
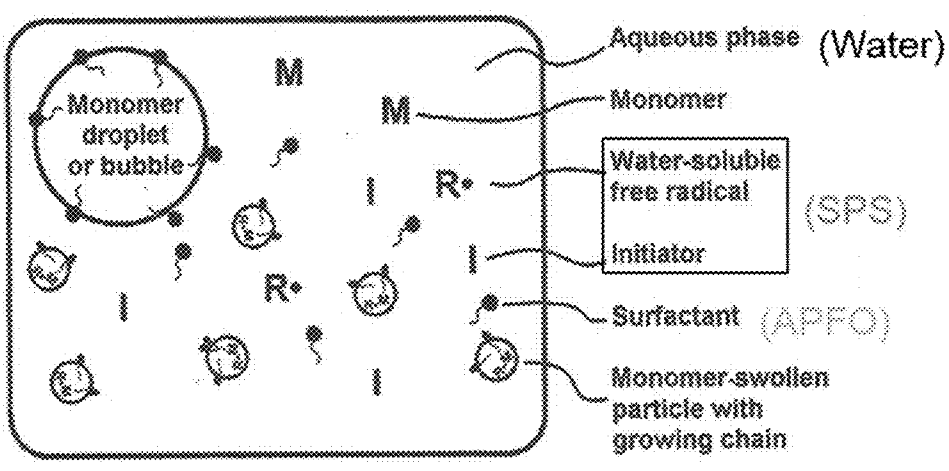

PROCESS FOR POLYMERIZING MOLECULAR-WEIGHT CONTROLLED POLYMER

CROSS-REFERENCE TO RELATED APPLICATIONS

This application is a national phase under 35 U.S.C. § 371 of PCT International Application No. PCT/KR2021/002198 which has an International filing date of Feb. 22, 2021, which claims priority to Korean Application No. 10-2020-0025544, filed Feb. 28, 2020, Korean Application No. 10-2020-0025545, filed Feb. 28, 2020, and Korean Application No. 10-2020-0034090, filed Mar. 19, 2020, the entire contents of each of which are hereby incorporated by reference.

TECHNICAL FIELD

The present invention relates to a molecular weight-adjustable polymer synthesis process.

BACKGROUND ART

In general, a polymer synthesis process is performed in a manner in which a mixture containing a monomer, a solvent, and a catalyst is fed into a batch reactor and then reacted.

The synthesis using the above-mentioned batch reactor shows an excellent conversion rate of monomer to polymer but relatively low efficiency. Specifically, once reactants enter the reactor, neither the feeding of an additional reactant nor the discharging of a reaction product can be carried out until the reaction is completed. Hence, a subsequent step can be performed after respective steps of feeding reactants, conducting a reaction, and discharging a product are fully completed, and thus the efficiency of polymer production is relatively low. Therefore, a novel reactor design capable of continuously performing feeding reactants, conducting a reaction, and discharging a product is needed.

Moreover, a conventional polymer synthesis process has a problem in that a polymer having a desired molecular weight is difficult to synthesize. The polymer synthesis reaction is characterized in that chain reactions occur, and thus a polymer having a specific molecular weight is difficult to synthesize by reaction control. However, the molecular weight is an important factor that has a great influence on properties of a polymer, and thus a process of synthesizing a polymer having a desired molecular weight is essentially needed.

DISCLOSURE

Technical Problem

An aspect of the present invention is to provide a polymer synthesis process capable of synthesizing a polymer with a desired molecular weight while continuously performing feeding reactants, conducting a reaction, and discharging a product.

Technical Solution

In accordance with an aspect of the present invention, there is provided a molecular weight-adjustable polymer synthesis process, the polymer synthesis process including: a reactant feeding step of feeding a gaseous monomer, a surfactant, and an initiator; a synthesis reaction step of conducting a synthesis reaction involving the monomer, the surfactant, and the initiator; and a product discharging step of discharging a polymer compound produced by the synthesis reaction, wherein the flow rate of the initiator fed is inversely proportional to the molecular weight of the polymer compound, and the molecular weight of the polymer compound produced by the synthesis reaction is adjusted by controlling the flow rate of the initiator.

According to an exemplary embodiment of the present invention, the monomer may include 1,1-difluoroethylene, the polymer compound may include polyvinylidene fluoride, and the initiator may include sodium persulfate.

According to an exemplary embodiment of the present invention, the flow rate of the initiator may be controlled to 2.0 mL/min to 0.5 mL/min when the molecular weight of the polymer compound to be synthesized is 90,000 to 200,000, and the flow rate of the initiator may be controlled to 0.5 mL/min to 0.1 mL/min when the molecular weight of the polymer compound to be synthesized is 200,000 to 500,000.

According to an exemplary embodiment of the present invention, the reactant feeding step, the synthesis reaction step, and the product discharging step may be simultaneously and continuously performed after set-up of a reactor, and an unreacted portion of the monomer may be separated from the polymer compound by liquid-gas separation and again fed into the reactor.

According to an exemplary embodiment of the present invention, the polymer synthesis process may further include, after the product discharging step: aggregating the polymer compound by using iron chloride or aluminum chloride; separating the monomer from the polymer compound through gas-liquid separation; and separating the polymer compound and unreacted portions of the surfactant and the initiator through centrifugation.

According to an exemplary embodiment of the present invention, in the synthesis reaction step, the monomer and the surfactant may form a micelle structure, and free radicals generated from the initiator may penetrate into the micelle structure to allow the synthesis reaction to be conducted.

In accordance with an aspect of the present invention, there is provided a polymer synthesis apparatus, including: a first pipe through which a gaseous monomer is fed; a second pipe through which a surfactant is fed and which is provided independently from the first pipe; a third pipe through which an initiator is fed and which is provided independently from the first and second pipes; a reaction chamber which is connected to the first, second, and third pipes and in which a synthesis reaction involving the monomer, the surfactant, and the initiator is conducted; and a fourth pipe which is connected to the reaction chamber and through which a polymer compound produced by the synthesis reaction is discharged, wherein the feeding of the monomer through the first pipe, the feeding of the surfactant through the second pipe, the feeding of the initiator through the third pipe, and the discharging of the polymer compound through the fourth pipe are simultaneously and continuously performed, and an unreacted portion of the monomer is separated from the polymer compound by liquid-gas separation and again fed into the first pipe.

According to an exemplary embodiment of the present invention, the polymer synthesis apparatus may further include a purification device for aggregating and purifying the polymer compound, wherein the purification device has iron chloride or aluminum chloride for conducting an aggregation reaction of the polymer compound.

According to an exemplary embodiment of the present invention, the first pipe may be connected to a lower part of the reaction chamber, and the fourth pipe may be connected to an upper part of the reaction chamber.

In accordance with an aspect of the present invention, there is provided a polymer synthesis apparatus, including: a first pipe through which a gaseous monomer is fed; a second pipe through which a surfactant is fed and which is provided independently from the first pipe; a third pipe through which an initiator is fed and which is provided independently from the first and second pipes;

a first chamber which is connected to the first and second pipes and in which a stirring operation is performed so as to allow the monomer and the surfactant to form intermediate micelles; and a second chamber which is connected to the first chamber and receives the initiator and the intermediate micelles to conduct a synthesis reaction for producing a polymer compound, wherein the intermediate micelles are divided into micro-micelles by ultrasonic irradiation before conducting the synthesis reaction in the second chamber, and the initiator penetrates into the micro-micelles to allow the synthesis reaction to be conducted.

According to an exemplary embodiment of the present invention, the ultrasonic irradiation may be performed at an output of 500 W to 1,000 W in the second chamber.

Advantageous Effects

According to an embodiment of the present invention, feeding reactants, conducting a reaction, and discharging a product can be continuously performed, leading to excellent efficiency of the polymer synthesis process.

Furthermore, according to an embodiment of the present invention, a polymer with a desired molecular weight can be synthesized to produce a customized polymer for each application field.

Furthermore, according to an embodiment of the present invention, the conversion rate of monomer to polymer is excellent.

BRIEF DESCRIPTION OF DRAWINGS

FIG. 1 is a block diagram showing a polymer synthesis apparatus according to an embodiment of the present invention.

FIG. 2 is a perspective view showing a polymer synthesis apparatus according to an embodiment of the present invention.

FIG. 3 shows a polymer synthesis apparatus according to another embodiment of the present invention.

FIG. 4 is a flowchart showing a polymer synthesis process according to an embodiment of the present invention.

FIG. 5 is a flowchart showing a polymer synthesis process according to another embodiment of the present invention.

FIG. 6 is a flowchart showing a part of a polymer synthesis process according to an embodiment of the present invention.

FIGS. 7A to 7C are pictures showing a PVADF polymer compound produced according to an embodiment of the present invention.

FIG. 8A is a graph showing the change in molecular weight of a polymer depending on the flow rate of an initiator, and FIG. 8B shows GPC results of polymers having a molecular weight of about 500,000 or more.

FIG. 9 shows morphological analysis results of a PVDF colloid by using a scanning electron microscope (SEM).

FIG. 10 conceptually shows a polymer synthesis process according to an embodiment of the present invention.

DETAILED DESCRIPTION OF THE INVENTION

Since the present invention may be modified in various forms and may have various embodiments, the following exemplary embodiments are illustrated in the accompanying drawings and are described in detail with reference to the drawings. However, it should be understood that the present invention is not intended to limit specific invention forms but intended to cover all the modifications, equivalents, or substitutions belonging to the idea and technical scope of the present invention.

According to an embodiment of the present invention, a polymer synthesis apparatus can be provided wherein feeding reactants, conducting a polymer synthesis reaction, and discharging a product can be simultaneously and continuously performed to bring excellent process efficiency.

According to an embodiment of the present invention, a polymer with a desired molecular weight can be produced, and thus a customized polymer according to uses can be produced and provided. Furthermore, a polymer having a desired molecular weight is synthesized by a continuous synthesis process, leading to high production efficiency.

Figure 1:
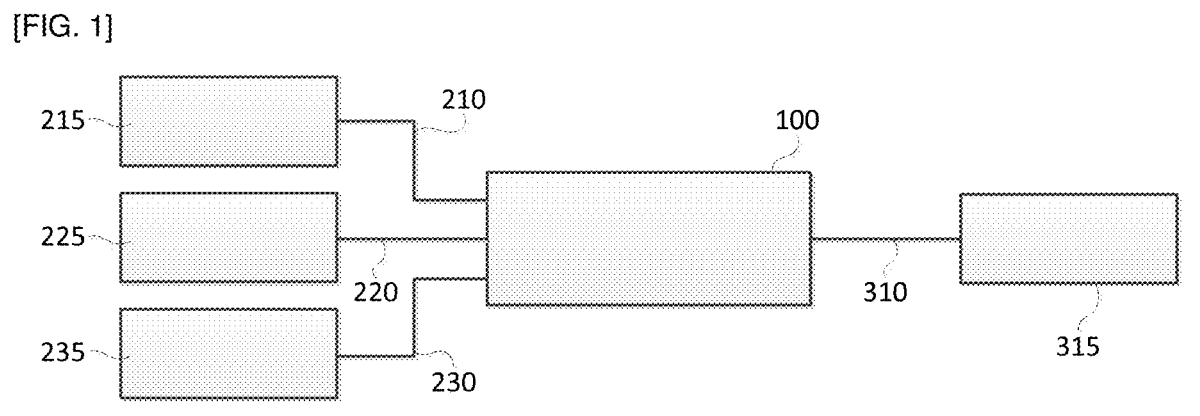

Referring to FIG. 1, a polymer synthesis apparatus is provided including a reaction chamber 100, a first pipe 210, a second pipe 220, a third pipe 230, and a fourth pipe 310.

The polymer synthesis apparatus is a reaction apparatus or process equipment for producing a polymer compound by using a monomer, an initiator, and a surfactant. The polymer compound refers a compound produced by a synthesis reaction of at least two monomer molecules. For example, when the monomer is 1,1-difluoroethylene, the polymer compound may be polyvinylidene fluoride produced by a synthesis reaction involving two or more molecules of 1,1-difluoroethylene. The molecular weight of the polymer compound may vary depending on the process conditions. Therefore, the polymer synthesis apparatus may be used to produce polymer compounds with various molecular weights.

The reaction chamber 100 is a place where the polymer synthesis reaction occurs. The reactants including a monomer, an initiator, and a surfactant are fed into the reaction chamber 100. The polymer synthesis reaction is conducted in the reaction chamber 100 after or at the same time as the feeding of the reactants.

The reaction chamber 100 offers a space where the synthesis reaction may occur. Therefore, the reaction chamber 100 may have a shape of an empty container. The shape of the container may vary. For example, the reaction chamber 100 may have various shapes, such as a cylinder, a sphere, and an elliptical sphere.

The reaction chamber 100 may be made of a material having low chemical reactivity such that the reaction chamber 100 neither participates in a synthesis reaction nor reacts with the reactants or the product. For example, the reaction chamber 100 may be made of stainless steel.

The reaction chamber 100 may further include a temperature controller and a pressure controller. The temperature controller and the pressure controller controls the temperature and pressure inside the reaction chamber 100 depending on the type of reactant and the target molecular weight of a polymer compound to be produced. Therefore, the chemical equilibrium in the reaction chamber 100 may be shifted.

The monomer, the initiator, and the surfactant are fed into the reaction chamber 100.

The monomer, the surfactant, and the initiator are fed into the reaction chamber 100 through the first pipe 210, the second pipe 220, and the third pipe 230, respectively. For this operation, the first pipe 210, the second pipe 220, and the third pipe 230 are separately connected to the reaction chamber 100.

The first pipe 210, the second pipe 220, and the third pipe 230 are provided independently. Specifically, the first pipe 210, the second pipe 220, and the third pipe 230 are separately provided and independently connected to one side of the reaction chamber 100. Therefore, the monomer, the surfactant, and the initiator transferred from the first pipe 210, the second pipe 220, and the third pipe 230, respectively, do not provoke a reaction due to the mixing thereof in the pipes, but react in only the reaction chamber 100. When the monomer, the surfactant, and the initiator are mixed to provoke a reaction in the pipes, the pipes are clogged with a product to be produced, and the process efficiency may be degraded.

The first pipe 210, the second pipe 220, and the third pipe 230 may be made of a material having low chemical reactivity. For example, the first pipe 210, the second pipe 220, and the third pipe 230 may be made of stainless steel, like the reaction chamber 100.

The shapes and diameters of the first pipe 210, the second pipe 220, the third pipe 230 may be different from each other. For example, the first pipe 210 transferring a gaseous monomer may have a relatively large pipe diameter since the molar volume occupied by the monomer fluid is relatively large. In addition, the first pipe 210 may be thicker than the second pipe 220 or the third pipe 230 to withstand the pressure of the gas.

For feeding of the monomer, the first pipe 210 may connect a first storage tank 215 storing the monomer therein and the reaction chamber 100. In the same manner, the second pipe 220 may connect a second storage tank 225 storing the surfactant therein and the reaction chamber 100, and the third pipe 230 may connect a third storage tank 235 storing the initiator therein and the reaction chamber 100. The first storage tank 215, the second storage tank 225, and the third storage tank 235 are not limited in shape and arrangement.

The monomer, the surfactant, and the initiator fed from the first pipe 210, the second pipe 220, and the third pipe 230 may react to produce a polymer compound in the reaction chamber 100. The polymer compound thus produced may be discharged through the fourth pipe 310.

The fourth pipe 310 is a pipe through which the polymer compound produced in the reaction chamber 100 is discharged. The discharging of the polymer compound may mean that the polymer compound may be transferred out of the reaction chamber 100. The fourth pipe 310 may be connected to other devices.

The material discharged through the fourth pipe 310 may contain other compounds in addition to the polymer compound. For example, unreacted portions of the monomer, surfactant, and initiator may be discharged together with the polymer compound through the fourth pipe 310.

The fourth pipe 310 may connect, for example, the reaction chamber 100 and a post-processing chamber 315. The post-processing chamber 315 may be a device in which a post-processing process, such as separating the polymer compound from the unreacted portions of the monomer, surfactant, and initiator, or washing and drying the polymer compound, is performed.

The post-processing chamber 315 may further include, for example, a purification device for aggregating and purifying the polymer compound, and the purification device may have iron chloride or aluminum chloride for conducting an aggregation reaction of the polymer compound. The details of the post-processing process by the purification device will be described later.

By using a polymer synthesis apparatus according to an embodiment of the present invention, the feeding of reactants through the first to third pipes 210, 220, and 230, the polymer synthesis reaction conducted in the reaction chamber 100, and the discharging of the polymer compound through the fourth pipe 310 may be simultaneously and continuously performed. Since the feeding of reactants, the polymer synthesis reaction, and the discharging of the product are performed simultaneously, the production efficiency in the polymer synthesis reaction by the polymer synthesis apparatus is excellent.

However, in the present invention, the meaning that the feeding of the reactants, the polymer synthesis reaction, and the discharging of the product are simultaneously performed does not indicate the quantitative agreement among the feeding amount of the reactants, the reaction amount in the polymer synthesis reaction, and the discharging amount of the product. For example, the feeding amount of the reactants may be larger than the discharging of the product, and the reaction amount in the polymer synthesis reaction may be smaller than the feeding amount of the reactants. The quantitative relationship among the above-described three numerical values may vary depending on process operating conditions.

Hereinbefore, the basic configuration of the polymer synthesis apparatus according to an embodiment of the present invention has been described with a focus on the connection relationships and functions. Hereinafter, a providing form of a polymer synthesis apparatus according to an embodiment will be described in more detail.

FIG. 2 is a perspective view showing a polymer synthesis apparatus according to an embodiment of the present invention. Hereinafter, in describing the polymer synthesis apparatus according to FIG. 2, the same contents as those described above will not be described in order to avoid duplication of contents.

Referring to FIG. 2, a stirring device 110 is further provided in the reaction chamber 100. The stirring device 110 is configured to stir and mix the monomer, surfactant, and initiator fed into the reaction chamber 100.

The monomer, the surfactant, and the initiator may be uniformly mixed by the stirring device 110 in the reaction chamber 100. The meaning that the above-described reactants are uniformly mixed in the reaction chamber 100 may indicate that the concentrations of the reactants are constantly maintained at substantially all the positions in the reaction chamber 100.

The shape or type of the stirring device 110 is not limited. For example, the stirring device 110 may be a commonly used impeller. The size of the stirring device 110 may be proportional to the capacity of the reaction chamber 100. Specifically, as the capacity of the reaction chamber 100 increases, the size of the stirring device 110 may increase in order to uniformly mix the reactants fed into the reaction chamber 100.

The stirring device 110 may uniformly mix the reactants as well as help initiate a synthesis reaction by reactants. Specifically, the monomer and surfactant fed into the reaction chamber 100 may be stirred by the stirring device 110 to form micelles. When the micelles composed of the monomer and the surfactant are sufficiently formed, free radicals generated from the initiator may penetrate into the micelles. The synthesis reaction using the monomer may be initiated by the penetration of free radicals into the micelles.

It can be confirmed that the first to third pipes 210, 220, and 230 are independently and separately provided as described above. The first to third pipes 210, 220, and 230 may be provided to a lower part of the reaction chamber 100. The lower part of the reaction chamber 100 may refer to a region close to the lower side of the reaction chamber 100 on the basis of the direction of gravity.

The first to third pipes 210, 220, and 230 may be provided to the lower part of the reaction chamber 100, leading to smoother mixing of the reactants. Specifically, the reactants introduced from the first to third pipes 210, 220, and 230 may be stirred and uniformly mixed while moving upward due to a difference in density in the reaction chamber 100. In particular, the monomer introduced from the first pipe 210 is introduced in a gas phase, and thus may be stirred and reacted while naturally moving upward in the reaction chamber 100. When the first pipe 210 is provided to an upper part of the reaction chamber 100, the monomer having a lower density than a solvent or the like fed into the reaction chamber 100 may stay only in the upper region in the reaction chamber 100, and thus the reactants may not be uniformly mixed in the reaction chamber 100. In such a situation, the reaction amount may be greatly reduced compared with the feeding amount of the reactants and the efficiency of the polymer synthesis apparatus may be degraded.

The first to third pipes 210, 220, and 230 may be joined to a reactant introduction unit 250, which enters the reaction chamber 100. Therefore, the monomer, the surfactant, and the initiator introduced from the first to third pipes 210, 220, and 230 may be primarily mixed in the reactant introduction unit 250. Specifically, the monomer, the surfactant, and the initiator introduced into the reactant introduction unit 250 may be primarily mixed since the diameter of the reactant introduction unit 250 is relatively small compared to that of the reaction chamber 100. As the mixture of the primarily mixed reactants is introduced into the reaction chamber 100 and stirred by the stirring device 110, the reactants can be uniformly mixed.

The fourth pipe 310 may be provided independently from the first to third pipes 210, 220, and 230 and may be provided to the upper part of the reaction chamber 100. The upper part of the reaction chamber 100 may refer to a region close to the upper side of the reaction chamber 100 on the basis of the direction of gravity. The fourth pipe 310 is provided to the upper part of the reaction chamber 100 and the first to third pipes 210, 220, and 230 are provided to the lower part of the reaction chamber 100, so that a reactant inlet and a product outlet may be provided separately at different regions. Therefore, the reactants may be discharged after sufficient stirring and reaction. Accordingly, the conversion rate of reactant to polymer is excellent.

According to an embodiment of the present invention, the efficiency in the polymer synthesis reaction is excellent since the stirring device 110 is provided in the polymer synthesis apparatus, and the first to third pipes 210, 220, and 230 and the fourth pipe 310 are separately provided to the upper part and the lower part of the reaction chamber 100, respectively.

Figure 3:
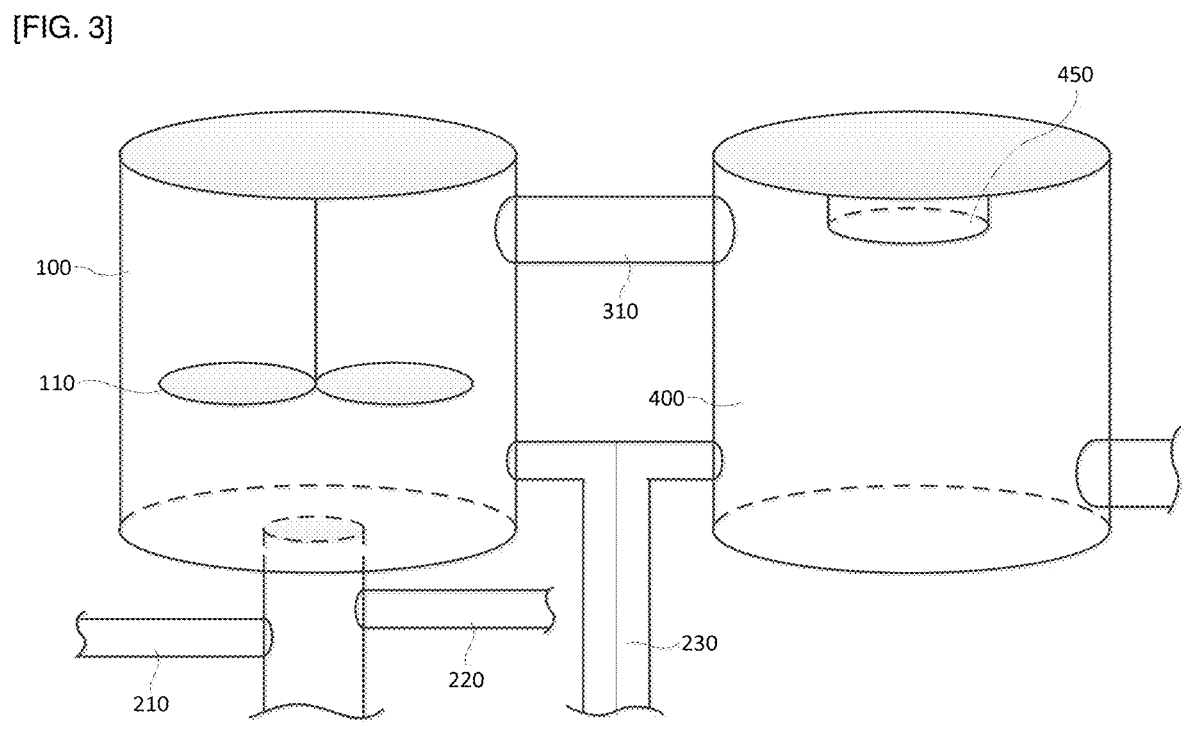

FIG. 3 shows a polymer synthesis apparatus according to another embodiment of the present invention.

FIG. 3 is a block diagram schematically showing a polymer synthesis apparatus according to an embodiment of the present invention.

Referring to FIG. 3, a polymer synthesis apparatus is provided including a first reaction chamber 100, a first pipe 210, a second pipe 220, a third pipe 230, and a second chamber 200.

The polymer synthesis apparatus is a reaction apparatus or process equipment for producing a polymer compound by using a monomer, an initiator, and a surfactant. The polymer compound refers a compound produced by a synthesis reaction of at least two monomer molecules. For example, when the monomer is 1,1-difluoroethylene, the polymer compound may be polyvinylidene fluoride produced by a synthesis reaction involving two or more molecules of 1,1-difluoroethylene. The molecular weight of the polymer compound may vary depending on the process conditions. Therefore, the polymer synthesis apparatus may be used to produce polymer compounds with various molecular weights.

The first chamber 100 is a place in which an intermediate micelle formation reaction, a part of the polymer synthesis reaction, is conducted. Reactants including a monomer and a surfactant are fed into the first chamber 100. The intermediate micelle formation reaction is conducted in the first chamber 100 after or at the same time as the feeding of the reactants. The intermediate micelles formed in the first chamber 100 may be composed of the surfactant and the monomer and may be relatively large compared to micro-micelles to be described later.

The first chamber 100 offers a space where the intermediate micelle formation reaction may occur. Therefore, the first chamber 100 may have a shape of an empty container. The shape of the container may vary. For example, the first chamber 100 may have various shapes, such as a cylinder, a sphere, and an elliptical sphere.

The first chamber 100 may be made of a material having low chemical reactivity such that the reaction chamber 100 neither participates in a polymer synthesis reaction nor reacts with the reactants or the product. For example, the first chamber 100 may be made of stainless steel.

The first chamber 100 may further include a temperature controller and a pressure controller. The temperature controller and the pressure controller control the temperature and pressure inside the first chamber 100 depending on the type of reactant and the target molecular weight of a polymer compound to be produced. Therefore, the chemical equilibrium in the first chamber 100 may be shifted.

The temperature in the first chamber 100 may be maintained lower than the temperature for the polymer synthesis reaction. More specifically, the first chamber 100 may be maintained at a temperature lower than the temperature for the free radical generation reaction by the initiator for initiating the synthesis reaction. For example, when the polymer synthesis reaction is a synthesis reaction for polyvinylidene fluoride, the temperature in the first chamber 100 may be lower than the temperature for the free radical generation reaction by sodium persulfate, which is an initiator involved in the synthesis reaction for polyvinylidene fluoride. Therefore, the free radicals generated from the initiator can penetrate into the intermediate micelles to prevent the initiation of the synthesis reaction in the first chamber 100. When the free radicals penetrate into the intermediate micelles to allow a synthesis reaction to be conducted in the first chamber 100, an advantageous effect resulting from a synthesis reaction using micro-micelles cannot be obtained as in those to be described later. Moreover, the pipes connecting the first chamber 100 and the second chamber 400 may be clogged with particles having a size increased by the synthesis reaction. Therefore, the temperature in the first chamber 100 may be maintained lower than the temperature for the synthesis reaction so as to prevent the occurrence of the free radical formation reaction and the synthesis reaction in the first chamber 100.

A stirring device 110 may be further provided in the first chamber 100. The stirring device 110 is configured to stir and mix the monomer and surfactant fed into the first chamber 100.

A first pipe 210 and a second pipe 220 are provided to feed the monomer and the surfactant into the first chamber 100 as described above.

The monomer and the surfactant are fed into the first chamber 100 through the first pipe 210 and the second pipe 220, respectively. For this operation, the first pipe 210 and the second pipe 220 are connected to the first chamber 100.

The first pipe 210 and the second pipe 220 are provided separately and independently. Specifically, the first pipe 210 and the second pipe 220 are separately provided and independently connected to one side of the first chamber 100. Therefore, the monomer and the surfactant transferred from the first pipe 210 and the second pipe 220, respectively, do not provoke a reaction by mixing in the pipes, but react in only the first chamber 100. When the monomer and the surfactant are mixed to provoke a reaction in the pipes, the pipes are clogged with a product to be produced, and the process efficiency may be degraded.

The first pipe 210 and the second pipe 220 may be made of a material having low chemical reactivity. For example, the first pipe 210 and the second pipe 220 may be made of stainless steel, like the first chamber 100.

The shapes and diameters of the first pipe 210 and the second pipe 220 may be different from each other. For example, the first pipe 210 transferring a gaseous monomer may have a relatively large pipe diameter since the molar volume occupied by the monomer fluid is relatively large. The first pipe 210 may be thicker than the second pipe 220 to withstand the pressure of the gas.

The first pipe 210 may connect a first storage tank 215 storing the monomer therein and the reaction chamber 100 to feed the monomer into the reaction chamber. Similarly, the second pipe 220 may connect a second storage tank storing the surfactant therein and the first chamber 100. The first storage tank and the second storage tank are limited in shape and arrangement.

A third pipe 230 may be further provided independently from the first pipe 210 and the second pipe 220. An initiator may be fed through the third pipe 230, which may be connect to the first chamber 100 and/or the second chamber 400.

The connection form of the third pipe 230 may vary depending on the operation form of the synthesis reaction. For example, when the temperature of the first chamber 100 is maintained high, the third pipe 230 may not be connected to the first chamber 100 but may be connected to second chamber 400. In such a case, the intermediate micelle formation can be performed at a high temperature without fear of a free radical generation reaction by the initiator in the first chamber 100. As another example, the third pipe 230 may be connected to the first chamber 100, and the initiator may be fed into the first chamber 100 through the third pipe 230. In such a case, the initiator is uniformly mixed with the intermediate micelles in a reaction solution in the first chamber 100, and thus when in a subsequent process, the intermediate micelles and the initiator are moved into the second chamber 400 and a synthesis reaction is conducted, the synthesis reaction can be conducted uniformly and simultaneously. Therefore, the process efficiency of the synthesis reaction is excellent.

The shape or material of the third pipe 230 is not limited. For example, the third pipe 230, like the first pipe 210 or the second pipe 220, may also be made of a material having low chemical reactivity. Similarly, the third pipe 230 may be connected to the third storage tank storing the initiator therein.

The monomer and the surfactant fed from the first pipe 210 and the second pipe 220 may react to form intermediate micelles in the first chamber 100. The intermediate micelles thus formed may be discharged through the fourth pipe 310.

The fourth pipe 310 is a pipe through which the intermediate micelles formed in the first chamber 100, and in some cases, together with the initiator, are discharged together. The fourth pipe 310 may include a pump to rapidly move the intermediate micelles.

In the second chamber 400, a synthesis reaction involving the intermediate micelles fed from the fourth pipe 310 is conducted. Specifically, in the second chamber 400, the intermediate micelles are divided into micro-micelles, and the initiator penetrates into the micro-micelles to allow a synthesis reaction to be conducted. The micro-micelle indicates a micelle that is formed by the monomer and the surfactant and has a smaller size than the intermediate micelle. In addition, the penetration of the initiator indicates that free radicals generated from the initiator penetrate into the micro-micelles.

Like the first chamber 100, the second chamber 400 may have a shape of an empty container. The shape of the container may vary. The second chamber 400 may be made of a material having low chemical reactivity such that the second chamber 100 neither participates in a reaction nor reacts with the reactants or the product. For example, the second chamber 400 may be made of stainless steel. In addition, the second chamber 400 may further include a temperature controller and a pressure controller. The temperature controller provided in the second chamber 400 can increase the temperature inside the second chamber 400 to the temperature for the free radical generation reaction by the initiator and maintain the temperature.

An ultrasonic irradiation device 450 for forming the micro-micelles may be further provided in the second chamber 400. The intermediate micelles are divided into micro-micelles through ultrasonic irradiation by the ultrasonic irradiation device 450. Since the micro-micelles thus formed have a relatively small size and are more than the intermediate micelles, the conversion rate of monomer into polymer by a synthesis reaction can be improved. The polymer thus produced may have a longer chain length. For example, the chain length of the produced polymer satisfies the relationship of Equation 1 below, and may be relatively long depending on the formation of micro-micelles.

$$v \propto \frac{k_p[M]N}{2fk_d[I]} \qquad \text{Equation 1}$$

In Equation 1, v represents the average chain length of the polymer; $k_p$ represents the growth rate constant; [M] represents the concentration of the monomer; N represents the number of micelles; f represents the efficiency factor of the initiator; $k_d$ represents the degradation constant of the initiator; and [I] represents the concentration of the initiator.

Since the ultrasonic irradiation device 450 is provided in the second chamber 400, the place (the second chamber 400) where the dividing into micro-micelles and the polymer synthesis reaction are performed and the place (the first chamber 100) where the surfactant and the monomer are stirred to form the intermediate micelles may be separated. When the forming of the intermediate micelles, the dividing into the micro-micelles, and the polymer synthesis reaction are all performed in one chamber without the first chamber 100 and the second chamber 400 being separated as described above, the intermediate micelles may be used in the polymer synthesis reaction before being divided into the micro-micelles. Specifically, before the intermediate micelles are divided into the micro-micelles, free radicals generated from the initiator may penetrate into the intermediate micelles to allow a synthesis reaction to be conducted. In such a case, advantageous effects (an improvement in PDI, an increase in polymer chain length, and an improvement in conversion rate of monomer to polymer by a synthesis reaction) that can be obtained by ensuring micro-micelles cannot be sufficiently obtained. Especially, the intermediate micelles are larger than the micro-micelles, and thus the volume occupied by the intermediate micelles is greater than the volume occupied by the micro-micelles, and free radicals are more likely to penetrate into the intermediate micelles than the micro-micelles. Therefore, the effects by the micro-micelles to be obtained in the present invention cannot be obtained in a state where micro-micelles and intermediate micelles are present together.

The ultrasonic irradiation device 450 is operated at an output of about 500 W to about 1,000 W, and applies ultrasonic irradiation to a medium (e.g., a reactant solution containing the intermediate micelles and the initiator) provided inside the second chamber 400. The intermediate micelles may be divided into smaller micro-micelles by ultrasonic irradiation. When the output of the ultrasonic irradiation device 450 is less than about 500 W, the dividing of the micelles may not be sufficiently attained, resulting in a deterioration in PDI of the produced polymer. Conversely, when the output of the ultrasonic irradiation device 450 is more than about 1,000 W, the PDI of the produced polymer may deteriorate due to an excessive influence on the micelles. Therefore, the output of the ultrasonic irradiation device 450 may be adjusted to about 500 W to about 1,000 W in order to ensure uniform polymer synthesis (high PDI) while increasing the conversion rate of the monomer by the synthesis reaction.

The ultrasonic irradiation device 450 may be provided at such a position that ultrasonic irradiation is evenly applied to the inside of the second chamber 400. For example, the ultrasonic irradiation device 450 may be provided in the form of being attached to one surface of the second chamber 400 or extended to the inside of the second chamber 400. A plurality of ultrasonic irradiation devices 410 may be provided as needed. In addition to the ultrasonic irradiation device 450, a physical stirring device for promoting the dividing of the intermediate micelles may be additionally provided in the second chamber 400.

The polymer compound produced by the synthesis reaction in the second chamber 400 is discharged out of the second chamber 400. The discharged reaction product solution may contain the polymer compound and unreacted portions of the monomer, surfactant, and initiator. The second chamber 400 may be connected to a post-processing chamber to separate and post-process the above-described materials.

The post-processing chamber may be a device in which a post-processing process, such as separating the polymer compound from the unreacted portions of the monomer, surfactant, and initiator, or washing and drying the polymer compound, is performed.

The post-processing chamber may further include, for example, a purification device for aggregating and purifying the polymer compound, and the purification device may have iron chloride or aluminum chloride for conducting an aggregation reaction of the polymer compound. The details of a post-processing process by the purification device will be described later.

By using a polymer synthesis apparatus according to an embodiment of the present invention, the feeding of the reactants through the first to third pipes 210, 220, and 230, the polymer synthesis reaction performed in the first chamber 100, and the discharging of the polymer compound through the fourth pipe 310 may be simultaneously and continuously performed. Since the feeding of the reactants, the polymer synthesis reaction, and the discharging of the product are performed simultaneously, the production efficiency in the polymer synthesis reaction by the polymer synthesis apparatus is excellent.

Hereinbefore, the polymer synthesis apparatuses according to the embodiments of the present invention have been described in detail. The polymer synthesis process will be described in an aspect of a process method below.

FIG. 4 is a flowchart showing a polymer synthesis process according to an embodiment of the present invention.

According to FIG. 4, the polymer synthesis process is conducted by including a reactant feeding step S100, a synthesis reaction step S200, and a product discharging step S300.

The reactant feeding step S100 indicates a step in which a gaseous monomer, a surfactant, and an initiator are fed into a reaction chamber through a first pipe, a second pipe, and a third pipe, respectively.

The synthesis reaction step S200 indicates a step in which a synthesis reaction is conducted by the involvement of the reactants including the monomer, surfactant, and initiator fed into the reaction chamber. For the synthesis reaction, the monomer, the surfactant, and the initiator may be stirred in the reaction chamber. In the synthesis reaction step, the monomer and the surfactant may form micelles, and free radicals generated from the initiator may penetrate into the micelles to allow a synthesis reaction to be conducted.

The product discharging step S300 indicates a step in which a polymer compound produced by the synthesis reaction is discharged. The polymer compound is discharged through the fourth pipe.

The reactant feeding step S100, the synthesis reaction step S200, and the product discharging step S300 are simultaneously and continuously performed after set-up of the reactor. The set-up of the reactor may indicate a process performed before the feeding of the reactants into the reaction chamber, the initiating of a reaction, and the discharging of a product having a desired molecular weight. That is, the reactant feeding step S100, the synthesis reaction step S200, and the product discharging step S300 may be simultaneously performed after the product having a desired molecular weight starts to be discharged. Therefore, the process according to an embodiment of the present invention may exhibit excellent process efficiency compared with a conventional process according to which one step is completed and then another step is performed.

According to an embodiment of the present invention, the flow rate of the initiator is controlled so as to allow the produced polymer compound to have a desired molecular weight. Specifically, the flow rate of the initiator is inversely proportional to the molecular weight of the polymer compound, and thus the molecular weight of the polymer compound produced by the synthesis reaction is adjusted by controlling the flow rate of the initiator.

For example, when the monomer is 1,1-difluoroethylene and the polymer compound is polyvinylidene fluoride, the molecular weight of polyvinylidene fluoride can be adjusted by controlling the flow rate of an initiator containing sodium persulfate.

In the above-described case, the molecular weight of the polymer compound can be adjusted between 500,000 to 90,000 by controlling the flow rate of the initiator between 0.1 mL/min and 2 mL/min. As discussed above, the relationship of Equation 1 below may be established between the flow rate of the initiator and the molecular weight of the polymer compound (the average chain length of the polymer compound).

$$v \propto \frac{k_p[M]N}{2fk_d[I]} \quad \text{Equation 1}$$

(v: the average chain length of the polymer, $k_p$: the growth rate constant, [M]: the concentration of the monomer, N: the number of micelles, f: the efficiency factor of the initiator, $k_d$: the degradation constant of the initiator, [I]: the concentration of the initiator)

The above-described relationship of Equation 1 may be established only when the polymer compound is produced by emulsion synthesis. Through the above-described relationship, the molecular weight of the synthesized polymer compound (the average chain length of the polymer compound) can be adjusted by controlling the flow rate of the initiator.

According to an embodiment of the present invention, a reaction environment may be created such that the synthesis reaction is conducted in an emulsion state while the polymer compound is continuously synthesized. As the synthesis reaction is conducted in an emulsion state, the synthesis reaction can be conducted at a relatively low pressure. According to the present invention, the synthesis reaction may be conducted at a low pressure of, for example, about 10 bar to about 20 bar. On the other hand, when the synthesis reaction is conducted in a suspension state like in the conventional art, the synthesis reaction is conducted at a high pressure of about 130 bar to about 280 bar. When the synthesis reaction is conducted at a high pressure, there are many restrictions on the design of a reactor, the control of a relief valve, and the like.

According to an embodiment of the present invention, the molecular weight of the polymer compound can be adjusted by controlling the flow rate of the initiator, and thus a polymer having a desired molecular weight can be precisely produced.

FIG. 5 is a flowchart showing a polymer synthesis process according to an embodiment of the present invention.

According to FIG. 5, the polymer synthesis process is conducted by including a reactant feeding step S100, an intermediate forming step S200, a micro-micelles forming step S300, a synthesis reaction step S400, and a product discharging step S500.

The reactant feeding step S100 indicates a step in which a gaseous monomer and a surfactant are fed into a first chamber through a first pipe and a second pipe.

The intermediate forming step S200 indicates a step in which a monomer and a surfactant are mixed by stirring to form intermediate micelles in the first chamber. In the intermediate forming step S200, the initiator may or may not be introduced into the first chamber. When the initiator is introduced into the first chamber, the process temperature in the intermediate forming step S200 may be maintained not higher than the temperature for the free radical generation reaction by the initiator so that free radicals are not generated from the initiator.

The micro-micelle forming step S300 indicates a step in which the intermediate micelles are divided into smaller-sized micro-micelles in the second chamber. In such a case, ultrasonic irradiation may be applied inside the second chamber for dividing the intermediate micelles into micro-micelles.

The synthesis reaction step S400 indicates a step in which a synthesis reaction is conducted by the involvement of the formed micro-micelles and the free radicals generated from the initiator in the second chamber. Specifically, the free radicals generated from the initiator may penetrate into the micro-micelles to allow a synthesis reaction to be conducted. In order to generate free radicals in the synthesis reaction step S400, the temperature inside the second chamber may be raised to no lower than the temperature for the free radical generation reaction.

The product discharging step S500 indicates a step in which the polymer compound produced by the synthesis reaction is discharged.

The above-described polymer synthesis process may be performed simultaneously and continuously after set-up of the reactors. The set-up of the reactors may indicate a process performed before the feeding of the reactants into the first chamber and the second chamber, the initiating of the synthesis reaction, and the discharging of a product having a desired molecular weight. That is, the reactant feeding step S100, the intermediate forming step S200, the micro-micelle forming step S300, the synthesis reaction step S400, and the product discharging step S500 may be simultaneously performed after the product having a desired molecular weight is discharged. Therefore, the process according to an embodiment of the present invention may exhibit excellent process efficiency compared with a conventional process, according to which one step is completed and then another step is performed.

However, in the present invention, the meaning that the feeding of reactants, the forming of the intermediate, the forming of the micro-micelles, the polymer synthesis reaction, and the discharging of the product are simultaneously performed does not indicate the quantitative agreement among the feeding amount of reactants, the reaction amount in the polymer synthesis reaction, and the discharging amount of the product. For example, the feeding amount of the reactants may be larger than the discharging of the product, and the reaction amount in the polymer synthesis reaction may be smaller than the feeding amount of the reactants. The quantitative relationship among the above-described three numerical values may vary depending on process operating conditions.

According to an embodiment of the present invention, a reaction environment may be created such that the synthesis reaction is conducted in an emulsion state while the polymer compound is continuously synthesized. As the synthesis reaction is conducted in an emulsion state, the synthesis reaction can be conducted at a relatively low pressure. According to the present invention, the synthesis reaction may be conducted at a low pressure of, for example, about 10 bar to about 20 bar. On the other hand, when the synthesis reaction is conducted in a suspension state as in the conventional art, the synthesis reaction is conducted at a high pressure of about 130 bar to about 280 bar. When the synthesis reaction is conducted at a high pressure, there are many restrictions on the design of a reactor, the control of a relief valve, and the like.

After the discharging of the polymer compound, the discharged polymer compound may be subjected to a post-processing process.

FIG. 6 is a flowchart showing a part of the polymer synthesis process according to an embodiment of the present invention.

After the product discharging step S300, a step of aggregating the polymer compound by using iron chloride or aluminum chloride S410; a step of separating the monomer from the polymer compound through gas-liquid separation S420; and a step of separating the polymer compound and unreacted portions of the surfactant and the initiator through centrifugation S430 may be additionally performed.

The step of aggregating the polymer compound S410 may indicate a step in which the polymer compound is aggregated in a mixture of the polymer compound, the solvent, and other unreacted portions of the reactants, the mixture being discharged through the fourth pipe. The produced polymer compound is suspended in a colloidal state in the mixture and then may be aggregated by iron chloride or aluminum chloride. Since the aggregated polymer compound is relatively large, the polymer compound can be easily separated from the mixture by a physical method.

The step of separating the monomer from the polymer compound through gas-liquid separation S420 indicates a process of separating a gaseous monomer fluid. According to an embodiment of the present invention, the monomer is provided in a gaseous state, so that the monomer can be relatively easily separated from the mixture discharged through the fourth pipe. The gas-liquid separation may employ various methods such as distillation. The separated monomer may be compressed and again introduced into the reaction chamber through the first pipe. Therefore, the monomer can be continuously reacted but not discarded after a single process, so that the conversion rate in the entire process after the continuous reaction is maintained high.

The step of separating the polymer compound and the unreacted portions of the surfactant and the initiator through centrifugation S430 indicates a step of separating the aggregated polymer compound and other compounds. The aggregated polymer compound has a relatively large weight, and thus can be easily separated from the mixture in a liquid state by centrifugation.

Hereinbefore, the polymer synthesis process according to an embodiment of the present invention has been described in detail. Hereinafter, the conditions and results of the polymer synthesis processes according to the present invention will be described in more detail.

Test Example 1: Conditions for PVDF Synthesis Reaction

FIGS. 7A to 7C are images showing a PVADF polymer compound produced according to an embodiment of the present invention.

To produce the polymer compounds shown in FIGS. 7A to 7C, 1,1-difluoroethylene (VDF) gas was used as a monomer. Ammonium pentadecafluorooctanoate (APFO, >98.0%) was purchased from TCI and used as a surfactant, and sodium persulfate (SPS) was purchased from Sigma-Aldrich and used as an initiator. Distilled water was prepared using a Milli-Q system.

Continuous PVDF emulsion synthesis was performed under predetermined temperature and pressure conditions. All experiments were conducted at a steady state after the initiator, the surfactant, and the monomer were constantly injected to fill a chamber before the initiation of a reaction. Specifically, the initiator dissolved in distilled water, and the surfactant were prepared to have desired concentrations, and introduced into respective storage tanks, followed by oxygen removal through a vacuum operation.

Synthesis conditions were established based on batch-type VDF emulsion synthesis conditions optimized using APFO, a fluorine-based surfactant. About 3.72 g of the initiator (sodium persulfate) and about 4.66 g of the surfactant (APFO) were dissolved relative to about 1,000 g of a solution before use. For the adjustment of the solid concentration and the molecular weight, the flow rates of monomer/initiator/surfactant introduction pumps were controlled. The pressure of the entire process is adjusted by controlling a relief valve at the end point of a process line closely associated with the absorption of VDF. The reaction mixture was subjected to moisture removal after passing through a gas-liquid separator, and the separated VDF was compressed and recycled. The product was subjected to chloride aggregation-washing-filtering-drying to thereby finally obtain PVDF.

The PVDF production process was as follows. The solution containing the surfactant (APFO) dissolved therein was injected into the reaction chamber through the third pipe, and the solution containing the initiator (SPS) dissolved therein was injected into the reaction chamber through the second pipe. The VDF monomer was injected into the reaction chamber through the first pipe. In the reaction chamber, the surfactant and the monomer form micelles through stirring. When free radicals were generated from the initiator through temperature raising, the free radicals thus generated penetrated into the micelles to allow the synthesis using VDF to be initiated.

The PVDF product was discharged in a colloidal form out of the reaction chamber through the fourth pipe. A PVDF emulsion was formed after the passage time of the entire system over time, and it was observed that the molecular weight was increased with time.

The initial experiment conditions were as follows. The flow rate of the surfactant (APFO) was about 8 mL/min (about 0.037 g/min on the basis of a concentration of about 0.466 wt %); the flow rate of the initiator (SPS) was about 2 mL/min (about 0.007 g/min on the basis of a concentration of about 0.372 wt %); and the flow rate of the VDF monomer was set to about 560 cc/min. Assuming that VDF was an ideal gas, the introduction weight per unit time was about 1.6 g/min. In all the experiments of the present examples and comparative examples, the temperature was maintained at about 89° C. (the temperature inside the reaction chamber was about 83° C.), and the pressure was maintained at about 15 atmG.

The produced PVDF colloid was repeatedly purified to remove remaining surfactant or initiator. The purification was performed by centrifugation. Specifically, centrifugation was performed under conditions of a rotor speed of about 10,000 rpm and about 15 minutes. After the centrifugation, the solvent was removed, and then distilled water was added again, followed by dispersion using an ultrasonic disperser, and then impurities were removed using a centrifuge as much as possible. PVDF was obtained by repeating this procedure three times and dried using the OV-11 apparatus at about 60° C. for about 24 hours in a vacuum state, thereby obtaining a PVDF powder.

FIG. 7A is a photograph of a PVDF colloid dispersed in distilled water, finally obtained in the reactor; FIG. 7B is a photograph of the PVDF colloid separated from the solvent after centrifugation; and FIG. 7C is a photograph of a finally dried PVDF powder.

PVDF synthesized according to the above-described conditions of Test Example 1 was measured for the molecular weight by GPC. The GPC measurement was performed at 40° C. by gel permeation chromatography (GPC, YL 9100, YL Instrument Co.) while N,N-dimethylformamide (DMF) with LiBr was used as a solvent, and mono-dispersed polystyrene standards were used. The measurement results are shown in FIG. 1.

TABLE 1

| Flow rate of surfactant (mL/min) | Flow rate of initiator (mL/min) | Flow rate of monomer (cc/min) | PVDF molecular weight | PDI |
|---|---|---|---|---|
| 8 | 2 | 560 | 90,542 | 1.98 |

The molecular weight of the synthesized PVDF was adjusted by controlling the flow rate of the initiator in Test Example 2 below on the basis of the results of Table 1 as above.

Test Example 2: Adjustment of PVDF Molecular Weight Through Control of Flow Rate of Initiator FIG. 8A is a graph showing the change in molecular weight of the polymer depending on the flow rate of the initiator; and FIG. 8B shows GPC results of polymers having a molecular weight of about 500,000 or more.

Table 2 shows the molecular weight results obtained when the flow rate of the initiator was lower than the initial condition in Test Example 1. As the flow rate of the initiator was decreased, the molecular weight was increased, and when the flow rate of the initiator was decreased to about 0.25 mL/min, the molecular weight of the polymer compound arrived at about 300,000 or more. When the flow rate of the initiator was decreased to about 0.1 mL/min, a polymer compound having a molecular weight of about 500,000 or more was obtained.

The graph showing the change in molecular weight of the polymer depending on the flow rate of the initiator is shown in FIG. 8A. The GPC results of the polymers having a molecular weight of about 500,000 or more obtained under the conditions where the flow rate of the initiator was about 0.1 mL/min are shown in FIG. 8B.

TABLE 2

| Flow rate of surfactant (mL/min) | Flow rate of initiator (mL/min) | Flow rate of monomer (cc/min) | PVDF molecular weight | PDI |
|---|---|---|---|---|
| 8 | 0.5 | 560 | 188,722 | 2.69 |
| 8 | 0.25 | 560 | 362,587 | 2.56 |
| 8 | 0.1 | 560 | 517,184 | 2.19 |

On the graph, the molecular weight was rapidly increased from a flow rate of the initiator of about 0.5 mL/min. Therefore, on the basis of a flow rate of the initiator of about 0.5 mL/min, the flow rate of the initiator was controlled to about 2.0 mL/min to about 0.5 mL/min when the molecular weight of a polymer compound to be synthesized was about 90,000 to about 200,000, and the flow rate of the initiator was controlled to about 0.5 mL/min to about 0.1 mL/min when the molecular weight of a polymer compound to be synthesized was about 200,000 to about 500,000. As described above, a polymer compound having a desired molecular weight can be easily produced by controlling the flow rate of the initiator. The fact that the molecular weight of the PVDF polymer can be adjusted in a wide range as shown in the experimental results indicates that thermal/chemical properties of the polymer were changed in various forms. This consequently indicates that the produced polymer compound can be applied in a wide range of the whole industry. The use of the process according to the present invention can facilitate the control of the molecular weight of PVDF widely used in the industry, and this is industrially very important.

Test Example 3: Analysis of PVDF Structure Using SEM

FIG. 9 illustrates morphological analysis results of the PVDF colloid by using a scanning electron microscope (SEM).

The morphology of the PVDF colloid having a molecular weight of about 500,000 or more synthesized using continuous synthesis was analyzed by a scanning electron microscope. The MIRA3 TESCAN scanning electron microscope used an energy of about 10 kV, and the measurement length between the microscope and the PVDF sample was based on about 3.2 mm. The PVDF colloid obtained through the scanning electron microscopic observation had round particle shapes, and the particle size thereof was about 88.48 nm. It was therefore confirmed that emulsion synthesis was well attained despite the control of the flow rate of the initiator. However, it was confirmed that the particles may not be uniform when a fast stirring of about 1,000 rpm was accompanied during the synthesis procedure.

Next, the PVDF conversion rate was investigated when continuous synthesis was performed. The PVDF conversion rate obtained through continuous synthesis was calculated as {(weight of produced PVDF)/(weight of introduced VDF)}×100.

Test Example 4: Analysis of Difference in PVDF Conversion Rate Depending on Stirring Speed

TABLE 3

| | | Stirring speed (rpm) | Surfactant (mL/min) | Initiator (mL/min) | Monomer (cc/min) | Conversion rate (%) | |
|---|---|---|---|---|---|---|---|
| Comparative Example | | 500 | 8 | 0.25 | 560 | 2.61 | |
| Example 2-1 | 1st round | 750 | 8 | 0.25 | 560 | 2.61 | 2.77 (Average) |
| | 2nd round | 750 | 8 | 0.25 | 560 | 2.84 | |
| | 3rd round | 750 | 8 | 0.25 | 560 | 2.87 | |
| Example 2-2 | 1st round | 1,000 | 8 | 0.25 | 560 | 2.97 | 2.92 (Average) |
| | 2nd round | 1,000 | 8 | 0.25 | 560 | 2.88 | |
| | 3rd round | 1,000 | 8 | 0.25 | 560 | 2.90 | |

The conversion rate results obtained from the comparative example was shown in the first row in Table 3. The obtained conversion rate was about 2.61%. A synthesis reaction was performed while the stirring speeds for Examples 2-1 and 2-2 were about 750 rpm and about 1,000 rpm, respectively. In order to improve the reliability of experimental results, the experiment was conducted a total of three times under each condition. Referring to Table 3 above, the PVDF conversion rates as a results of implementing the process performance under the process conditions for Examples 2-1 and 2-2 were increased compared with the conversion rate of the comparative example.

Test Example 5: Analysis of Difference in PVDF Conversion Rate Depending on Amount of Surfactant

TABLE 4

| | | Stirring speed (rpm) | Surfactant (mL/min) | Initiator (mL/min) | Monomer (cc/min) | Conversion rate (%) | |
|---|---|---|---|---|---|---|---|
| Comparative Example | | 1,000 | 8 | 0.25 | 560 | 2.91 | |
| Example 3-1 | 1st round | 1,000 | 6 | 0.25 | 560 | 3.87 | 4.13 (Average) |
| | 2nd round | 1,000 | 6 | 0.25 | 560 | 4.31 | |
| | 3rd round | 1,000 | 6 | 0.25 | 560 | 4.22 | |
| Example 3-2 | 1st round | 1,000 | 4 | 0.25 | 560 | 6.09 | 6.16 (Average) |
| | 2nd round | 1,000 | 4 | 0.25 | 560 | 6.22 | |
| | 3rd round | 1,000 | 4 | 0.25 | 560 | 6.16 | |

The conversion rate obtained from the comparative example was shown in the first row in Table 4. The changes in conversion rate were measured by lowering the flow rate of the surfactant from about 8 mL/min in the comparative example to 6 mL/min (Example 3-1) and 4 mL/min (Example 3-2). In order to improve the reliability of experimental results, the experiment was performed a total of three times under each condition. The experimental results are shown in Table 4. When the introduction amount of the surfactant (APFO) solution was lowered from about 8 mL/min for the comparative example to about 4 mL/min for Example 3-2, the conversion rate was increased by about 2.11 times, from about 2.91% to about 6.16%. It was construed that in the continuous polymer synthesis process, the reaction amount was increased as the time the reactants stayed in the reactor was increased. The results confirmed that a decrease in the flow rate of the surfactant (APFO) solution was a main factor in increasing the conversion rate.

Test Example 6: Analysis of Difference in PVDF Conversion Rate Depending on Amount of Monomer

TABLE 5

| | | Stirring speed (rpm) | Surfactant (mL/min) | Initiator (mL/min) | Monomer (cc/min) | Conversion rate (%) | |
|---|---|---|---|---|---|---|---|
| Comparative Example | | 1,000 | 8 | 0.25 | 560 | | 2.91 |
| Example 4-1 | 1st round | 1,000 | 8 | 0.25 | 280 | 8.01 | 8.14 (Average) |
| | 2nd round | 1,000 | 8 | 0.25 | 280 | 8.22 | |
| | 3rd round | 1,000 | 8 | 0.25 | 280 | 8.18 | |
| Example 4-2 | 1st round | 1,000 | 8 | 0.25 | 140 | 12.16 | 12.16 (Average) |
| | 2nd round | 1,000 | 8 | 0.25 | 140 | 12.25 | |
| | 3rd round | 1,000 | 8 | 0.25 | 140 | 12.08 | |

The conversion rate obtained from the comparative example was shown in the first row in Table 5. The changes in conversion rate were measured by lowering the flow rate of the VDF monomer from about 560 cc/min for the comparative example to about 280 cc/min (Example 4-1) and about 140 cc/min (Example 4-2). In order to improve the reliability of experimental results, the experiment was conducted a total of three times under each condition. The results are shown in Table 5. When the introduction amount of the VDF monomer was lowered from about 560 cc/min for the comparative example to about 140 cc/min for Example 4-2, the conversion rate was increased by about 4.15 times, from about 2.91% to about 12.16%. The conversion rate did not change when the flow rate of the VDF monomer was less than about 140 cc/min. The results confirmed that the flow rate of VDF was a great factor in increasing the conversion rate and the PVDF conversion rate was maximized when the flow rate of the VDF monomer was about 140 cc/min to about 280 cc/min.

The conversion rate was increased through the control of the flow rate of VDF, but the molecular weight did not change. When the flow rate of VDF was about 560 cc/min, the conversion rate was about 2.91% and the molecular weight of the produced PVDF was about 362,587 g/mol. When the flow rate of VDF was about 140 cc/min, the conversion rate was about 12.25% and the molecular weight was about 355,386 g/mol. The difference in molecular weight was about 7,000 g/mol, which was within the error range in the GPC measurement. That is, it was confirmed that the flow rate of VDF and the molecular weight of the produced polymer were independent variables.

The GPC measurement was performed at about 40° C. by gel permeation chromatography (GPC, YL 9100, YL Instrument Co.), while N,N-dimethylformamide (DMF) with LiBr was used as a solvent, and mono-dispersed polystyrene standards were used.

Next, the PVDF conversion rate was investigated when a process including a micro-micelle dividing process was used.

Test Example 7: Conditions for PVDF Synthesis Reaction

FIG. 10 is a conceptual diagram of a polymer synthesis process according to an embodiment of the present invention.

Test Example 7-1: Experimental Materials

To produce a polymer compound, 1,1-difluoroethylene (VDF) gas was used as a monomer. Ammonium pentadecafluorooctanoate (APFO, >98.0%) was purchased from TCI and used as a surfactant, and sodium persulfate (SPS) was purchased from Sigma-Aldrich and used as an initiator. Distilled water was prepared using a Milli-Q system.

Continuous PVDF emulsion synthesis was performed under predetermined temperature and pressure conditions. All experiments were conducted at a steady state after the initiator, the surfactant, and the monomer were constantly injected to fill a chamber before the initiation of a reaction. Specifically, the initiator dissolved in distilled water, and the surfactant were prepared to have desired concentrations, and introduced into respective storage tanks, followed by oxygen removal through a vacuum operation.

Synthesis conditions were established on the basis of batch-type VDF emulsion synthesis conditions optimized using APFO, a fluorine-based surfactant. About 3.72 g of the initiator (sodium persulfate) and about 4.66 g of the surfactant (APFO) were dissolved relative to about 1,000 g of a solution before use.

Test Example 7-2: Process Control Conditions

For the adjustment of the solid concentration and the molecular weight, the flow rates of monomer/initiator/surfactant introduction pumps were adjusted. The pressure of the entire process is adjusted by controlling a relief valve at the end point of a process line closely associated with the absorption of VDF. The reaction mixture was subjected to moisture removal after passing through a gas-liquid separator, and the separated VDF was compressed and recycled. The product was subjected to chloride aggregation-washing-filtering-drying to thereby finally obtain PVDF.

In the first chamber, the surfactant and the monomer form micelles through appropriate stirring. Thereafter, the mixed solution was moved to the second chamber. When free radicals were generated from the initiator through temperature raising in the second chamber, the free radicals thus generated penetrated into the micelles to allow the synthesis using VDF to be initiated. The second chamber can further micronize the micelles by simple stirring. The molecular weight of the resultant polymer was increased. The formation of further micronized micro-micelles facilitates the movement of the initiator in the water layer, thereby achieving higher conversion rates. Therefore, higher molecular weights and higher conversion rates can be achieved under the same conditions, compared with existing CSTR PVDF polymer synthesis processes using physical stirring. Finally, the PVDF product were discharged in a colloidal form out of the reactor.

Fixed experimental conditions for the above-described polymer synthesis were as follows. The flow rate of APFO was about 8 mL/min (about 0.037 g/min based on a concentration of about 0.466 wt %); the flow rate of SPS was about 2 mL/min (about 0.007 g/min based on a concentration of about 0.372 wt %); and the flow rate of the VDF monomer was set to about 560 cc/min. Assuming that VDF was an ideal gas, the introduction weight per unit time was about 1.6 g/min. In addition, the temperature and pressure in all experiments in the present study were fixed to the following values: (1) Temperature: 89° C. set (the temperature inside the reactor being 83° C.), (2) Pressure: 15 atmG, (3) Physical stirring speed: 1,000 rpm.

The produced PVDF micelles were repeatedly purified to remove remaining surfactant or initiator. The purification employed centrifugation. The centrifugation was performed under the conditions of a rotor speed of 10,000 rpm and 15 min. Thereafter, the solvent was removed, and then distilled water was added again, followed by dispersion using an ultrasonic disperser, and then impurities were removed using a centrifuge as much as possible. PVDF was obtained by repeating this procedure three times and dried using the OV-11 apparatus at about 60° C. for about 24 hours in a vacuum state to thereby obtain a PVDF powder.

Test Example 7-3: Comparison Between Synthesis by Simple Stirring and Synthesis Using Ultrasonic Irradiation A process was performed under the above-described polymer synthesis conditions, and then the produced PVDF was analyzed.

The GPC measurement was performed at about 40° C. by gel permeation chromatography (GPC, YL 9100, YL Instrument Co.), while N,N-dimethylformamide (DMF) with LiBr was used as a solvent, and mono-dispersed polystyrene standards were used.

The PVDF conversion rate was calculated as {(weight of produced PVDF)/(weight of introduced VDF)}×100.

Table 1 shows the molecular weight change results and conversion rates when an ultrasonic device was not used (simple stirring) and when an ultrasonic device was used under the same conditions. A higher molecular weight was obtained as the ultrasonic energy increased, and this was considered to be due to the micronization of micelles.

In addition, a higher conversion rate was obtained as the ultrasonic energy increased, and this was considered to be due to the fact that the micronization of micelles increased the surface area of the micelles, and thus the amount of the initiator entering the micelles was increased.

TABLE 6

| | Stirring condition | Surfactant (APFO) | Initiator (SPS) | Monomer (VDF) | Mw | PDI | Conversion rate |
|---|---|---|---|---|---|---|---|
| Comparative Example 2 | Simple stirring (1,000 rpm) | 8 mL/min | 2 mL/min | 560 cc/min | 90,452 | 1.98 | 3.28% |
| Example 5-1 | Ultrasonic irradiation (500 W) | 8 mL/min | 2 mL/min | 560 cc/min | 113,478 | 2.15 | 3.51% |
| Example 5-2 | Ultrasonic irradiation (750 W) | 8 mL/min | 2 mL/min | 560 cc/min | 138,742 | 2.54 | 3.72% |
| Example 5-3 | Ultrasonic irradiation (1,000 W) | 8 mL/min | 2 mL/min | 560 cc/min | 155,621 | 2.14 | 3.94% |

Although the present invention has been described with reference to the preferable exemplary embodiments of the present invention, a person skilled in the art or a person having ordinary skill in the art will appreciate that various modifications, and substitutions are possible without departing from the scope and spirit of the invention set forth in the accompanying claims.

Accordingly, the technical scope of the present invention is not limited to the detailed description of this specification but should be defined by the claims.

The invention claimed is:

1. A weight average molecular weight-adjustable polymer synthesis process, the polymer synthesis process comprising:

a reactant feeding step of feeding a gaseous monomer, a surfactant, and an initiator into a reactor;

a synthesis reaction step of conducting a synthesis reaction involving the monomer, the surfactant, and the initiator; and a product discharging step of discharging a polymer compound produced by the synthesis reaction, adjusting a weight average molecular weight of the polymer compound produced by the synthesis reaction by controlling a flow rate of the initiator, wherein the flow rate of the initiator fed is inversely proportional to the weight average molecular weight of the polymer compound, simultaneously and continuously performing the reactant feeding step, the synthesis reaction step, and the product discharging step after set-up of a reactor, and separating an unreacted portion of the monomer from the polymer compound by liquid-gas separation and feeding the unreacted portion of the monomer into the reactor.

2. The weight average molecular weight-adjustable polymer synthesis process of claim 1, wherein the monomer includes 1,1-difluoroethylene, the polymer compound includes polyvinylidene fluoride, and the initiator includes sodium persulfate.

3. The weight average molecular weight-adjustable polymer synthesis process of claim 2, comprising controlling the flow rate of the initiator to 2.0 mL/min to 0.5 mL/min when the weight average molecular weight of the polymer compound to be synthesized is 90,000 to 200,000, and controlling the flow rate of the initiator to 0.5 mL/min to 0.1 mL/min when the weight average molecular weight of the polymer compound to be synthesized is 200,000 to 500,000.

4. The weight average molecular weight-adjustable polymer synthesis process of claim 1, further comprising, after the product discharging step:

aggregating the polymer compound by using iron chloride or aluminum chloride;

separating the monomer from the polymer compound through gas-liquid separation; and separating the polymer compound and unreacted portions of the surfactant and the initiator through centrifugation.

5. The weight average molecular weight-adjustable polymer synthesis process of claim 1, wherein in the synthesis reaction step, the monomer and the surfactant form a micelle structure, and free radicals generated from the initiator penetrate into the micelle structure to allow the synthesis reaction to be conducted.

* * * * *